United States Patent [19]
Kain

[11] Patent Number: 5,106,154
[45] Date of Patent: Apr. 21, 1992

[54] CAR SEAT WITH INTEGRAL CONVERTIBLE FRAME

[75] Inventor: James M. Kain, Tipp City, Ohio

[73] Assignee: Lisco, Inc., Tampa, Fla.

[21] Appl. No.: 525,002

[22] Filed: May 18, 1990

[51] Int. Cl.$^5$ .............................................. A47D 1/10
[52] U.S. Cl. ..................................... 297/250; 297/130
[58] Field of Search ....................... 297/250, 270, 130; 403/92, 93, 95

[56] References Cited

U.S. PATENT DOCUMENTS

| | | | |
|---|---|---|---|
| 3,794,379 | 2/1974 | Furey | 297/250 |
| 3,910,634 | 10/1975 | Morris | 297/250 |
| 3,922,035 | 11/1975 | Wener | 297/250 |
| 3,934,934 | 1/1976 | Farrell, Jr. et al. | 297/250 |
| 4,186,962 | 2/1980 | Meeker | 297/250 |
| 4,429,916 | 2/1984 | Hyde et al. | 297/250 |
| 4,688,850 | 8/1987 | Brownlie et al. | 297/250 |
| 4,738,489 | 4/1988 | Wise et al. | 297/250 |
| 4,743,064 | 5/1988 | Takizawa | 297/250 |
| 4,768,828 | 9/1988 | Kohketsu | 297/250 |
| 4,826,246 | 5/1989 | Meeker | 297/250 |
| 4,834,420 | 5/1989 | Sankrithi et al. | 297/250 |
| 4,861,105 | 8/1989 | Merten et al. | 297/250 |
| 4,902,026 | 2/1990 | Maldonado | 297/250 |
| 4,912,812 | 4/1990 | Meeker | 297/250 |
| 4,913,490 | 4/1990 | Takahashi et al. | 297/325 |

FOREIGN PATENT DOCUMENTS 2202433 9/1988 United Kingdom ................ 297/250

Primary Examiner—Kenneth J. Dorner
Assistant Examiner—Cassandra Hope

[57] ABSTRACT

An improved integral frame, convertible, child car seat positionable out of a car between reclined and erect orientations and positionable in a car either facing forwardly or rearwardly. The car seat comprises, in combination, a one-piece integral shell having a lower surface for the support thereof and an upper surface for the receipt of a child. The lower surface has a pair of planar extents, one forward and one rearward with an angle of about 160 degrees therebetween. Forward apertures in the shell are for securing the seat by the seat belt of a car in the rearward direction. Rearward apertures in the shell are for securing the seat by the seat belt of a car in the forward direction. A recline arm is pivotally secured to the shell. A lock secures the recline arm in a retracted position when the shell is in a reclined orientation supported on the rearward planar surface and secures the recline arm in an extended position when the shell is in a erect orientation supported on the forward planar surface. A shield is pivotally secured to the shell and movable between a raised inoperative position and a lowered operative position. A strap extends through the shell with a first end secured to the shell by an adjustable cam and a second end secured through a tongue to a releasable latch. Also included is a recessed tether for increased safety.

7 Claims, 4 Drawing Sheets

CAR SEAT WITH INTEGRAL CONVERTIBLE FRAME

BACKGROUND OF THE INVENTION

1. Field of the Invention

This invention relates to a car seat with an integral convertible frame and, more particularly, to a car seat for children positionable in a car facing forwardly or rearwardly and with its bottom surface configured to render it positionable in a reclining orientation or an erect orientation, the child car seat also includes a retractable recline arm used when the car seat is the erect orientation and, for further safety, a recessed tether.

2. Description of the Background Art

All parents share a concern for the safety of children in moving cars. Such concern is also shared by the government where safety laws are being enacted in an increasing number of jurisdictions. Because of such concerns, there has been an increasing number of improvements relating to child car seats. These improvements are directed to improved safety of children, infants as well as toddlers. Safety is increased with usage, and usage is increased when child car seats have extended utility, as when they may be used outside of cars in addition to being used within cars.

Commercially available child car seats and the background art patents disclose a wide variety of designs. As a general rule, when seats are designed for safe car usage, they are generally inconvenient for out-of-car usage. Similarly, seats designed for out-of-car usages are generally inconvenient for usage as car seats. Car seats are generally designed for being utilized in an erect orientation or a reclining orientation and are not readily convertible between such orientations.

By way of example note U.S. Pat. No. 4,743,064 to Takizawa; U.S. Pat. No. Des. 286,470 to Takada; and the commercially available Gerry Guardian Car Seat. Such devices are adapted for use as child car seats between the front and rear seats of a car, facing either forwardly or rearwardly. Such seats are also adapted for use outside of cars in an erect or reclined orientation. The Takizawa device is limited to a rearwardly facing device while in out-of-car use. It employs a pair of support members when in the reclined orientation. Note FIG. 7. The devices of Takada and Gerry employ a retractable support member when in the erect orientation. When such support member is exposed for use, the device rests at the junction of two lower surfaces. Note FIG. 7 of Gerry. None of these devices utilizes the safe and conveniently utilized leg locking device of the present invention.

In addition, many child car seats are adapted for being utilized in either the forward facing direction or the rearward facing direction. Note by way of example, U.S. Pat. Nos. 4,186,962 to Meeker; 4,613,188 to Tsuge and 4,768,828 to Kohketsu as well as U.S. Pat. Nos. Des. 242,093 to Cone and 298,388 to Wise.

In addition, there are many child seats having retractable support arms which are not specifically designed for use in cars. Note U.S. Pat. Nos. 4,123,102 to Landry; 4,440,331 to Schimmels; 4,456,302 to Knoedler; 4,500,133 to Nakao; 4,534,591 to Parker; and 4,688,850 to Brownlie as well as U.S. Pat. No. Des. 206,117 to Levy.

Lastly, tether bars with straps are also known for providing further securement of child car seats within cars. Tether bars, however, are normally bulky in their construction protruding rearwardly from the rear faces of the child car seats and around the sides thereof. Consider, for example, the Seven Year Car Seat of The Spalding and Evenflo Companies, Inc. While accomplishing their intended objective of increased safety, their designs are excessively bulky and costly.

None of the known commercial devices or prior patents disclose a child car seat for use in the forward or rearward direction when in the reclined orientation, and which also has utility outside of the car in either an erect or reclined orientation as disclosed herein and which also has a safe and convenient lockable recline arm extendable when the seat is in the erect orientation, and which has, for further safety, a tether strap and bar recessed with respect to the back of the seat. Although many such prior advances are noteworthy to one extent or another, no background patent or known commercial device teaches or suggests the reliable, convenient and economic, child car seat with integral convertible frame as disclosed herein.

As illustrated by a great number of prior patent disclosures and commercial devices efforts are continuously being made in an attempt to more efficiently design, manufacture and utilize child car seats. No prior effort, however, suggests the present inventive combination of component elements arranged and configured as disclosed herein. Prior devices do not provide the benefits attendant with the present invention. The present invention achieves its intended purposes, objects and advantages over the prior art devices through a new, useful and unobvious combination of component elements, through the use of a minimum number of functioning parts, at a reasonable cost to manufacture, and through the utilization of only readily available materials and conventional components.

Therefore, it is an object of this invention to provide an improved integral frame, convertible, child car seat positionable out of a car between reclined and erect orientations and positionable in a car either facing forwardly or rearwardly comprising, in combination, a one-piece integral shell having a lower surface for the support thereof and an upper surface for the receipt of a child, the lower surface having a pair of planar extents, one forward and one rearward with an angle of about 160 degrees therebetween; forward apertures in the shell for securing the seat by the seat belt of a car in the rearward direction and rearward apertures in the shell for securing the seat by the seat belt of a car in the forward direction; a recline arm pivotally secured to the shell; locking means to secure the recline arm in a retracted position when the shell is in a reclined orientation supported on the rearward planar surface and to secure the recline arm in an extended position when the shell is in a erect orientation supported on the forward planar surface; a shield pivotally secured to the shell and movable between a raised inoperative position and a lowered operative position; and strap means extending through the shell with a first end secured to the shell by an adjustable cam and a second end secured through a tongue to a releasable latch.

It is another object of this invention to safely utilize a child car seat in either an erect or inclined orientation.

It is a further object of this invention to safely and conveniently lock a recline arm of a child car seat in either a retracted position when the seat is in a reclined orientation or in an extended position where the child car seat is in an erect orientation.

It is a further object of this invention to safely secure a child car seat in a car by a seat belt in either the forward or rearward facing direction.

It is a further object of this invention to secure a child car seat through a tether strap and bar which is recessed with respect to the back of the seat.

Lastly, it is an object of this invention to restrain a child in a car safely, reliably, conveniently and economically.

The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a further understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims with the specific preferred embodiment shown in the attached drawings. For the purpose of summarizing the invention, the invention may be incorporated into an improved integral frame, convertible, child car seat positionable out of a car between reclined and erect orientations and positionable in a car either facing forwardly or rearwardly comprising, in combination, a one-piece integral shell having a lower surface for the support thereof and an upper surface for the receipt of a child, the lower surface having a pair of planar extents, one forward and one rearward with an angle of about 160 degrees therebetween; forward apertures in the shell for securing the seat by the seat belt of a car in the rearward direction and rearward apertures in the shell for securing the seat by the seat belt of a car in the forward direction; a recline arm pivotally secured to the shell; locking means to secure the recline arm in a retracted position when the shell is in a reclined orientation supported on the rearward planar surface and to secure the recline arm in an extended position when the shell is in a erect orientation supported on the forward planar surface; a shield pivotally secured to the shell and movable between a raised inoperative position and a lowered operative position; and strap means extending through the shell with a first end secured to the shell by an adjustable cam and a second end secured through a tongue to a releasable latch.

In addition, the invention may also be incorporated into a child car seat positionable out of a car between reclined and erect orientations and positionable in a car either facing forwardly or rearwardly comprising, in combination, a shell having a lower surface and an upper surface, the lower surface having a pair of planar extents, one forward and one rearward with an angle therebetween; a recline arm pivotally secured to the shell; locking means to secure the recline arm in a retracted position when the shell is in a reclined orientation supported on the rearward planar surface and to secure the recline arm in an extended position when the shell is in a erect orientation supported on the forward planar surface; a shield pivotally secured to the shell and movable between a raised position and a lowered position; and strap means extending through the shell with a first end secured to the shell by an adjustable member and a second end secured through a tongue to a releasable member.

The forward planar surface and the rearward planar surface form an angle of about 160 degrees therebetween. The lower surface has a back region with an upper and lower extent with an angle therebetween. The car seat further includes a pad with apertures therein aligned with the forward apertures of the shell for the passage of a car seat belt therethrough in contact with the surface of the pad when the car seat is in the rearward facing direction. The car seat further includes rearward apertures for the passage of a car seat belt therethrough when the car seat is in the forward facing direction. The locking means includes a cylinder extending through apertures in the shell and the shield with a key on the cylinder locatable in axial cutouts in the apertures, and with a spring urging the key into a locking orientation and movable to an orientation to allow rotation of the shield with respect to the shell.

Further, the invention may be incorporated into a child seat comprising, in combination, a shell; a shield pivotally secured to the shell and movable between a raised position and a lowered position; strap means extending through the shell with a first end secured to the shell by an adjustable member and a second end secured through a tongue to a releasable member; and spring means urging the shield to the raised position. The spring means is a coil spring axially positioned about a pivot pin coupling the shell and shield.

Lastly, the invention may be incorporated into a child car seat comprising, in combination, a shell having a front surface and an back surface; a shield pivotally secured to the shell and movable between a raised position and a lowered position; strap means extending through the shell with a first end secured to the shell by an adjustable member and a second end secured through a tongue to a releasable member; apertures extending through the shell for coupling the shell to a car through seat belts; and a tether including a belt and associated bar coupled to the shell at the back surface in a recessed orientation. The bar is of a length less than the width of the shell. The bar has ends with apertures and further included is means to couple the ends of the bar to protruding ribs on the back surface of the shell.

The foregoing has outlined rather broadly the more pertinent and important features of the present invention in order that the detailed description of the invention that follows may be better understood whereby the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other constructions for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar reference characters refer to similar parts throughout the several figures.

DETAILED DESCRIPTION OF THE INVENTION

Figure 1:
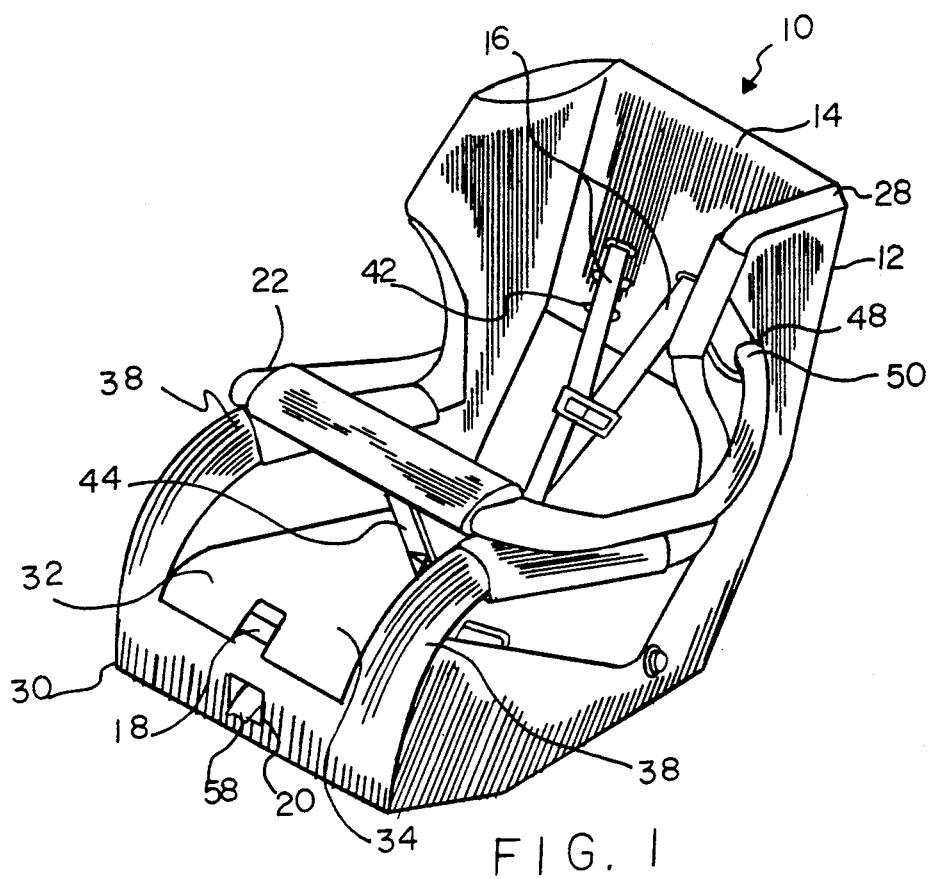
FIG. 1 is a perspective illustration of a child car seat with integral convertible frame constructed in accordance with the principles of the present invention.

From an overview standpoint, the present inventive child car seat 10 can most readily be seen by reference to the perspective showing of FIG. 1, particularly when viewed in association with the additional Figures. The child car seat with integral convertible frame of the present invention is made up of one major component, a frame or shell 12 with an appropriate comfort enhancing pad 14, restraining belts 16, latch 18, cam 20, shield 22 and tether 24.

The instant car seat 10 is generally conventional in various regards, but it is fabricated of an integral, one piece construction. It includes a main body portion or shell 12 extending from a head end 28 to a foot end 30 and is constructed of a length greater than the length of the child to be supported therein. The car seat 10 has an upper surface 32 which is contoured along its length with a seat 34 and back 36 in serpentine configuration for greater child comfort. Side portions 38 extend upwardly from both side edges of a central extent to restrain the child against lateral movement. A soft pad 14 is utilized upon which the child may be placed for greater comfort. Elongated slots 42 extend through the shell and pad at the back portion and the seat portion for the passage of a plurality of belts 16.

At their forward ends, the belts 16 are secured to a short forward strap 44. The lower end of the strap has a tongue receivable in releasable latch 18 with button for child securement and release. The upper end of the strap is coupled to the shield 22. The shield is a U-shaped member with shoulders 48 pivotally secured through pins 50 to the sides of the shell for movement between an inoperative elevated position and an operative lowered position. In this manner, the shield is secured in the lowered position when the tongue is secured in the latch. Depressing the latch button releases the tongue to thereby allow the shield and belts to be lifted from a child in the car seat 50. Such arrangement is conventional in the art. A coil spring 52 is axially positioned around at least one, but preferably both, of the pivot pins 50 which couple the shield 22 to the shell 12. The coil spring has its free ends 54 coupled to the shell and shield for urging the shield to be held in the elevated position once having been raised. Once lowered, however, the shield will remain there under the influence of gravity. The latch retaining the tongue, once engaged, further retains the shield in the lower position.

The rearward ends of the belts 16 are secured to a long rearward strap 58 through a bracket 60 in a lower, back region of the shell. The long strap 58 extends through a cam 20 with lever in a lower, front portion of the shell. Lifting the lever releases the cam for general adjustment of the strap and belts for accommodating the particular child sitting in the car seat. Release of the lever locks the strap and belts in proper position. Such arrangement is conventional in the art.

The car seat shell is properly fabricated of a rigid, impact resistant, high polymer plastic, such as polyethylene, polyvinylchloride, or the like. Its rear face is provided with horizontal and vertical strengthening ribs 64 and 66. The shell 12, pad 14, belts 16 and straps 44 and 58 are of any one of a plurality of esthetically pleasing colors.

Figure 4:
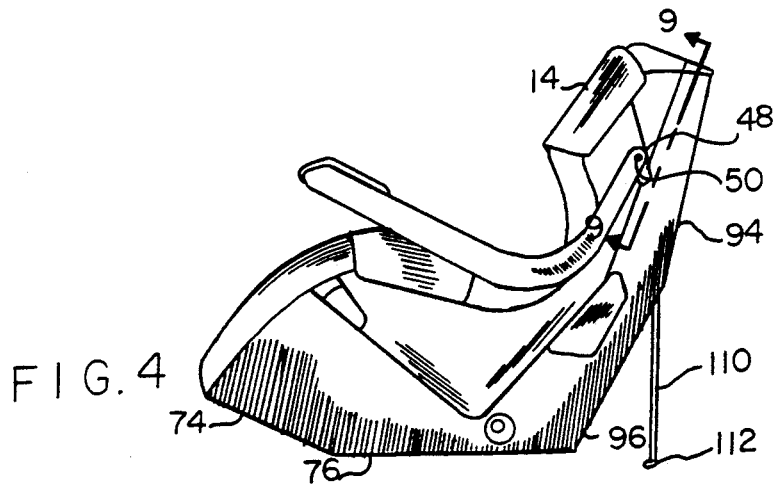
FIG. 4 is a side elevational view of the car seat shown in FIG. 1 in the reclined orientation but in an out-of-car mode.

The lower and rear surfaces of the carrier are uniquely configured for extended utility. When used outside of a car, the seat may be utilized in a reclining or an erect orientation. The reclining orientation, as best seen in FIG. 4, is utilized for either infants or toddlers. Infants are generally considered to be small children, up to about 20 lbs. Toddlers are generally considered to be larger children, between about 20 to 40 lbs. The age of about 6 months is normally the break point between infants and toddlers. The erect orientation of the present car seat is normally limited to older or stronger children over 6 months or between 20 and 40 lbs. wherein their muscle development has increased so that their necks will not harmfully wobble forwardly when in a seat in the erect orientation.

When in the erect orientation, a retractable recline arm 70 is pivoted downwardly by rotation on pins 72. When in the reclined orientation, the recline arm is pivoted upwardly into the carrier. Note FIG. 6 and compare it with FIGS. 5 and 7.

These two orientations are effected by having the lower portion of the seat formed of two essentially planar sections, the forward section 74 and the rearward section 76. These two sections are angled with respect to each other at about 160 degrees plus or minus 10 percent. The forward section is shorter than the rearward section, about half the length. In this manner, the infant seat may be safely and conveniently utilized in either the erect or reclined orientation.

Figure 8:
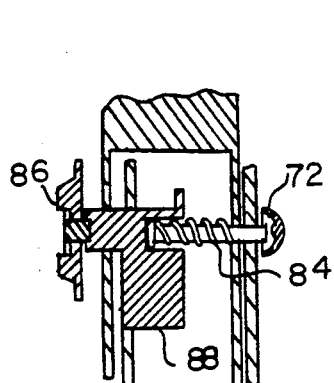
FIG. 8 is a cross sectional view of the shell of the car seat and the recline arm as shown in FIGS. 6 and 7 taken along the axis thereof to more clearly illustrate the locking mechanism and the operation thereof.
Figure 9:
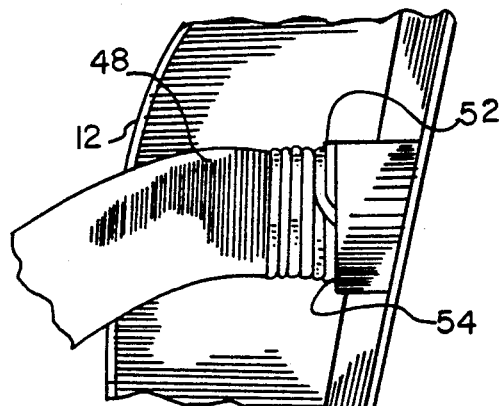
FIG. 9 is an enlarged view of the coupling between the shield and the shell.
Figure 10:
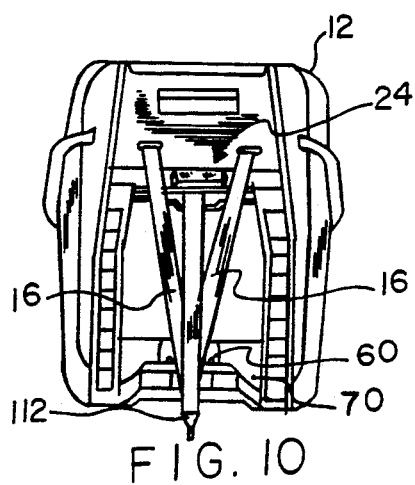
FIG. 10 is an elevational view of the rear face of the car seat showing the recessed tether.
Figure 11:
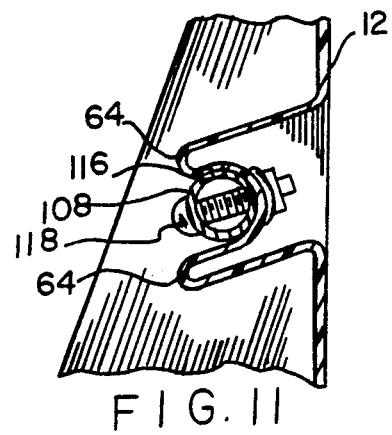
FIG. 11 is a sectional view of the tether taken along line 11—11 of FIG. 12.
Figure 12:
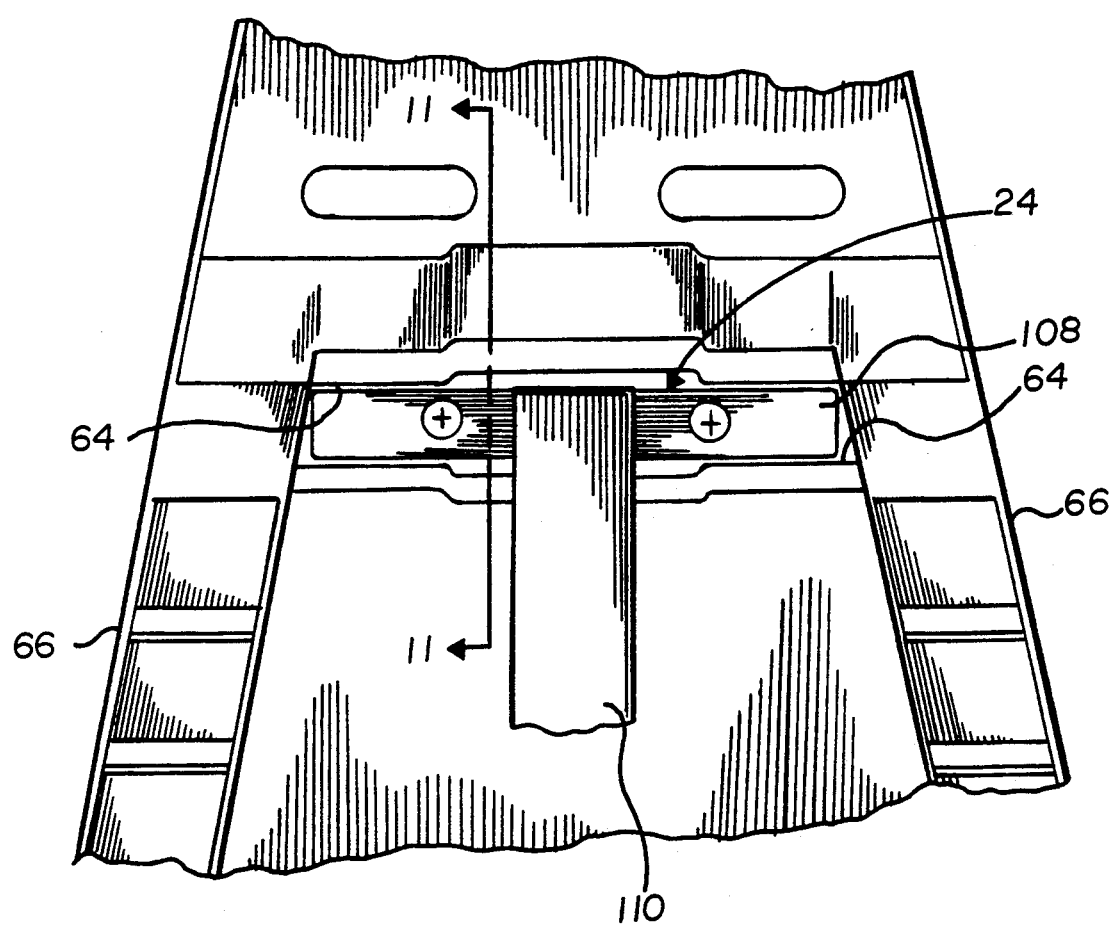
FIG. 12 is an enlarged elevational view of the recessed tether of FIG. 10.

The retractable recline arm 70 is preferably a one-piece member fabricated of the same rigid high-impact plastic as the carrier. It has a lower support surface 78 extending across the width of the shell. Its lower surface is adapted for continuous contact with the supporting surface for the seat. The recline arm 70 also has two radially extending legs 80 at its lateral extents with aligned apertures. Such apertures are aligned with apertures extending through the sides of the shell with pivot pins 72 extending therethrough. One of the pivot pins, the left as shown in the FIG. 8, has an internal coil spring 84 urging a button 86 outwardly away from the center of the shell. A parent may depress this button 86 whereafter the recline arm may be moved from the locked extended position. The spring frictionally urges the recline arm to retain it in the retracted position. The recline arm may thus be locked in either the extended position for holding the seat erect or in the retracted position for allowing the seat to be in the reclined orientation.

More specifically, locking of the recline arm 70 in the retracted or extended orientations is effected through a novel locking system. This system is most readily seen in FIGS. 6, 7 and 8. The locking system includes a central elongated pin 72 having a head at its exterior end and a nut at its interior end. The bolt extends through aligned apertures of the supporting rib and shell of the carrier and through aligned apertures of the inwardly extending legs 80 of the recline arm 70. A cylindrical plastic member is formed with an enlarged exterior button 86 for being depressed by an operator and an inwardly spaced intermediate cylinder having a radially extending key 88. The key has a rectangular profile. The intermediate cylinder also has an enlargement at its interior end for abutment against the associated leg of the recline arm. A coil spring 84 is located between the interior rib of the shell and the enlargement of the interior cylinder urging their separation.

Figure 5:
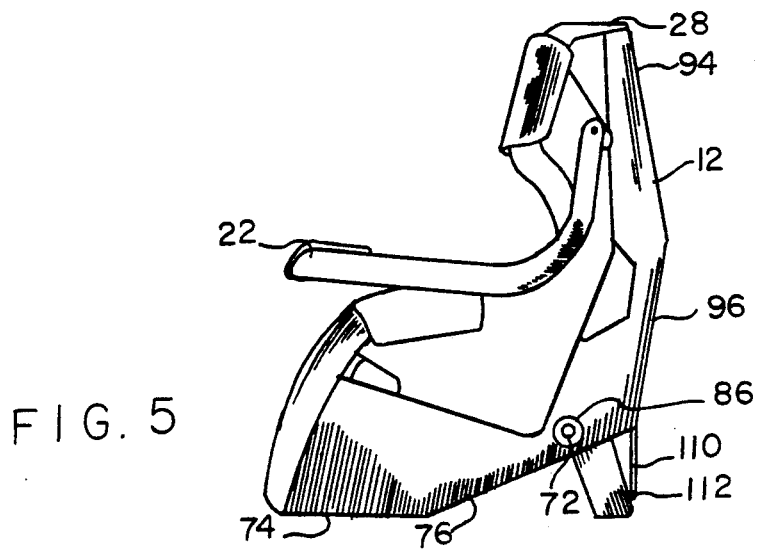
FIG. 5 is a side elevational view of the car seat shown in FIG. 1 in the erect orientation but in an out-of-car mode.
Figure 6:
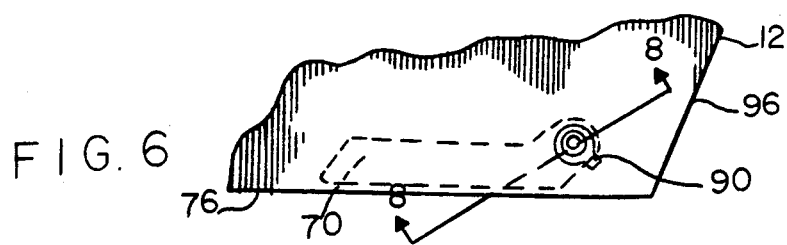
FIG. 6 is an enlarged side elevational view of a portion of the shell of the car seat and the recline arm in the retracted position.
Figure 7:
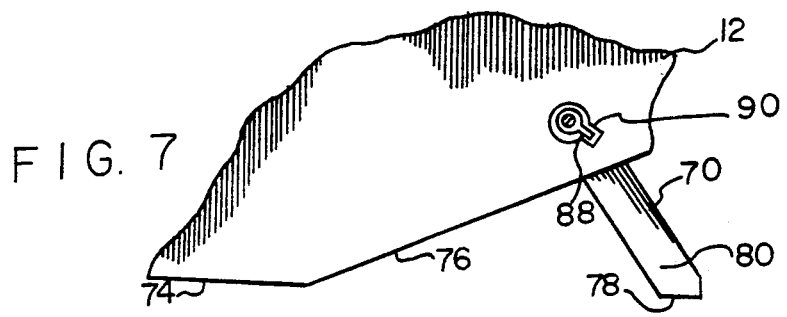
FIG. 7 is an enlarged side elevational view of a portion of the shell of the car seat and the recline arm in the extended position.

With the recline arm extended as shown in FIGS. 5 and 7, the key 88 extends through complimentary axial cutouts 90 in the apertures of the shell and leg for retaining the leg and recline arm in its extended position as shown in FIGS. 4 and 6. When, however, an operator depresses the button, the key clears the cutout of the shell to allow rotation of the intermediate cylinder, key 88 and recline arm 70 to the retracted position. This retracted position is maintained by the frictional contact of the axially exterior face of the key 88 against an interior surface of the shell, the frictional force being provided by the spring 84. Simple rotation of the support leg back to the extended position will realign the cutouts 90 of both the leg and shell. The button is urged by the action of the spring 84 away from its depressed position allowing the key 88 to enter the shell cutout 90 establishing the locking orientation.

The rear surface of the carrier is provided with an upper planar section 94 and a lower planar section 96 of approximately equal lengths. An angle therebetween of about 160 degrees plus or minus 10 percent. The upper extent is the back portion is at an angle slightly greater than 90 degrees with respect to the rearward portion of the base. In this manner, with the arm 70 retracted and the car seat resting on a seat of a car, the upper rear portion will be in flush contact with the exposed surface of the back of the seat of the car. Note FIG. 1 with the car seat in the forward facing direction. Although the car seat could be utilized in the erect rather than reclining orientation, it has been found that a forwardly facing car seat as disclosed herein is safer when utilized in the reclining orientation. Retention of the car seat in this orientation is readily effected by threading the seat belt 98 of the car through the rearward apertures 102 in the slides of the shell at a level beneath the joinder of the upper and lower extends of the back portion.

Figure 2:
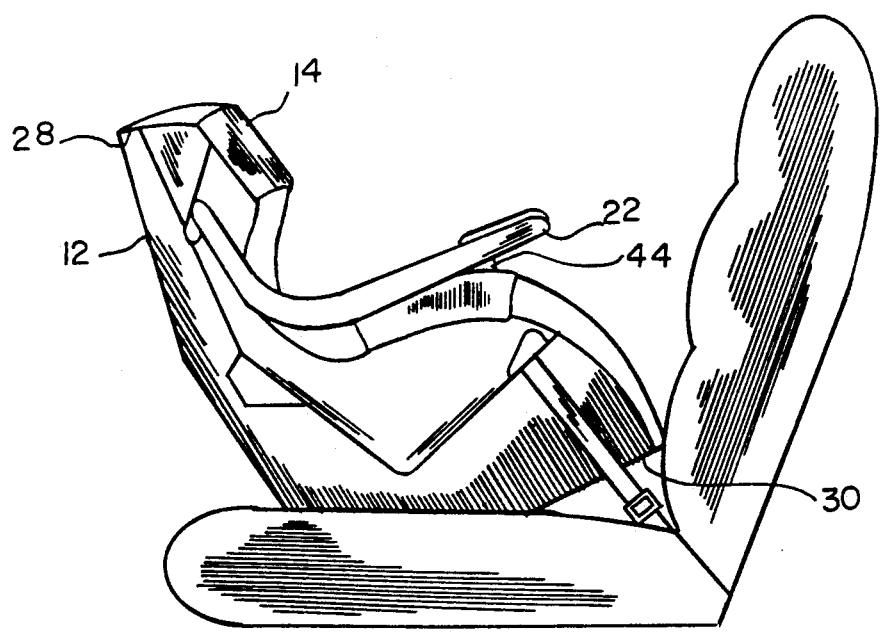
FIG. 2 is a side elevational view of the car seat shown in FIG. 1 but secured to a seat of a car by a seat belt in a rearward facing direction.
Figure 3:
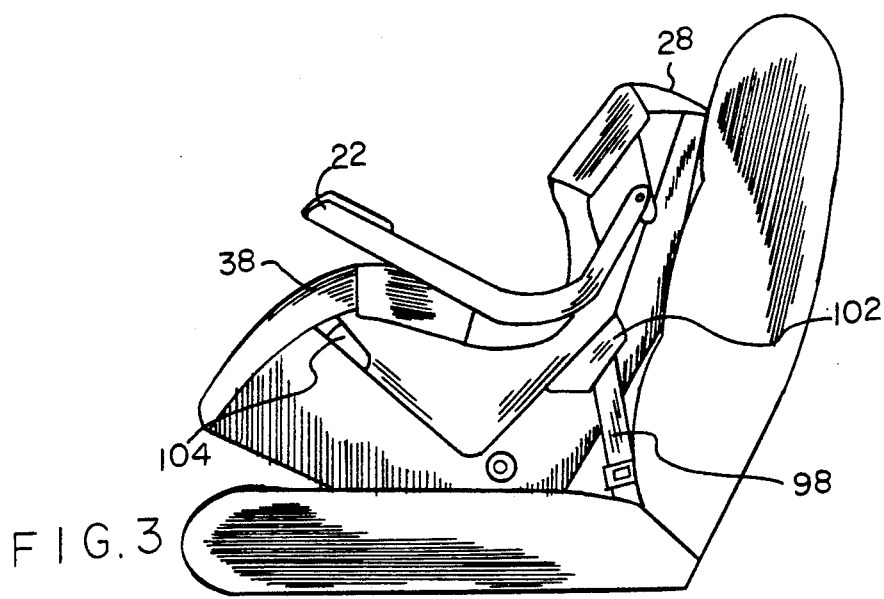
FIG. 3 is a side elevational view of the car seat shown in FIG. 1 but secured to a seat of a car by a seat belt in a forward facing direction.

As shown in FIG. 2, the car seat of the present invention may also be utilized in a rearwardly facing direction. To this end, additional apertures 104, forwardly located apertures, are provided in the sides of the shell above the forward portion of the base. The seat belt 98 is thus positioned over the pad, in contact therewith, having been passed through apertures in the pad adjacent to the forward apertures in the shell. To utilize this position, the car seat is located on the seat of the car in the reclined orientation and with the seat belt threaded through the forward apertures of the shell and adjacent apertures in the pad. This configuration is preferred for smaller children since they will be more closely sandwiched between the back of the child car seat the back of the seat of the car in which the child car seat is utilized. Further, smaller children are less likely to be irritated by the failure to watch the passengers in the car and the passing scene.

A last safety feature of the present invention is the tether 24. The tether includes a bar 108 and strap 110. The strap has a first end with a bracket 112 removably attachable to a portion of the car in which the car seat is to be utilized and a second end attached to the child car seat through a tether bar. The bar 108 is a short member having a length slightly greater than half the width of the shell. It is located on the back of the shell at an upper position. It spans a space bounded by horizontal strengthening ribs 64 of the shell. The ends of the bar are provided with apertures for coupling through aligned apertures at the base or a recess 116 between the ribs 64 thereby being recessed with respect to the back of the shell. The coupling of the bar to the shell is by fasteners 118 which are either permanent or releasable, preferably the nuts and bolts as shown. The use of a tether 24, in addition to the securement through the child car seat belt, adds further securement of the car seat to the car at an elevated location to further preclude tipping forward of the child car seat in the event of a sudden stop.

The tether is located on the back of the car seat at a centrally located upper region. It provides an anchor point for the car seat when in the forward-facing position. By holding back the upper or top of the seat, it prevents extreme movement forward or to the side in the event of a serious crash. Some car seats must use a top tether to meet the federal 30 mph performance standard. The car seat of the present invention meets this standard without the top tether. Many parents, however, may wish to use a top tether because it offers extra protection in the event of a crash.

Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. An integral frame, convertible, child car seat positionable out of a car between reclined and erect orientations and positionable in a car either facing forwardly or rearwardly comprising, in combination:

a one-piece integral shell having a lower surface for the support thereof and an upper surface for the receipt of a child, the lower surface having a pair of planar extents, one forward and one rearward with an angle of about 160 degrees therebetween;

forward apertures in the shell for securing the seat by a seat belt of a car in the rearward direction and rearward apertures in the shell for securing the seat by the seat belt of a car in the forward direction;

a recline arm pivotally secured to the shell;

locking means with a spring to positively secure the recline arm in a retracted position when the shell is in a reclined orientation supported flatly on the rearward planar extent and to secure the recline arm in an extended position when the shell is in an erect orientation supported flatly on the forward planar extent;

a shield pivotally secured to the shell and movable between a raised inoperative position and a lowered operative position; and strap means extending through the shell with a first end secured to the shell by an adjustable cam and a second end secured through a tongue to a releasable latch.

2. A child car seat positionable out of a car between reclined and erect orientations and positionable in a car either facing forwardly or rearwardly comprising, in combination:

a shell having a lower surface and an upper surface, the lower surface having a pair of planar extents, one forward and one rearward with an angle therebetween;

a recline arm pivotally secured to the shell;

locking means to secure the recline arm in a retracted position when the shell is in a reclined orientation supported on the rearward planar extent and to secure the recline arm in an extended position when the shell is in an erect orientation supported on the forward planar extent, the locking means including a cylinder extending through apertures in the shell and the shield with a key on the cylinder locatable in axial cutouts in the apertures when the recline arm is in the extended position, and with a spring urging the key into a locking orientation and movable to an orientation to allow rotation of the shield with respect to the shell;

a shield pivotally secured to the shell and movable between a raised position and a lowered position; and strap means extending through the shell with a first end secured to the shell by an adjustable member and a second end secured through a tongue to a releasable member.

3. The car seat as set forth in claim 2 wherein the forward planar extent and the rearward planar extent form an angle of about 160 degrees therebetween.

4. The car seat as set forth in claim 3 wherein the lower surface has a back region with an upper and lower extent with an angle therebetween.

5. The car seat as set forth in claim 2 and further including a pad with apertures therein aligned with the forward apertures of the shell for the passage of a car seat belt therethrough in contact with the surface of the pad when the car seat is in the rearward facing direction.

6. The car seat as set forth in claim 2 and further including rearward apertures for the passage of a car seat belt therethrough when the car seat is in the forward facing direction.

7. A child car seat comprising, in combination:

a shell having a front surface and a back surface;

a shield pivotally secured to the shell and movable between a raised position and a lowered position;

strap means extending through the shell with a first end secured to the shell by an adjustable member and a second end secured through a tongue to a releasable member;

apertures extending through the shell for coupling the shell to a car through seat belts; and a tether including a belt and associated bar coupled to the shell at the back surface in a recessed orientation and wherein the bar has an aperture at each end and further including means to couple the ends of the bar to protruding ribs on the back surface of the shell through the apertures.

* * * * *